US010763525B2

(12) United States Patent
Kapfhamer

(10) Patent No.: US 10,763,525 B2
(45) Date of Patent: Sep. 1, 2020

(54) DEVICE FOR SUPPLYING FUEL TO A MOTOR VEHICLE HAVING A FUEL CELL

(71) Applicant: AUDI AG, Ingolstadt (DE)

(72) Inventor: Jürgen Kapfhamer, Aichach (DE)

(73) Assignee: AUDI AG, Ingolstadt (DE)

( * ) Notice: Subject to any disclaimer, the term of this patent is extended or adjusted under 35 U.S.C. 154(b) by 108 days.

(21) Appl. No.: 15/715,003

(22) Filed: Sep. 25, 2017

(65) Prior Publication Data

US 2018/0090774 A1 Mar. 29, 2018

(30) Foreign Application Priority Data

Sep. 27, 2016 (DE) .................. 10 2016 218 616

(51) Int. Cl.
*H01M 8/043* (2016.01)
*H01M 8/04082* (2016.01)
*H01M 8/0656* (2016.01)

(52) U.S. Cl.
CPC ....... *H01M 8/043* (2016.02); *H01M 8/04201* (2013.01); *H01M 8/0656* (2013.01); *H01M 2250/20* (2013.01); *Y02T 90/32* (2013.01)

(58) Field of Classification Search
CPC ..................... Y02T 90/32; H01M 2250/20
See application file for complete search history.

(56) References Cited

U.S. PATENT DOCUMENTS

| 2003/0150218 A1 | 8/2003 | Ovshinsky et al. |
| 2005/0100767 A1 | 5/2005 | Stolmar |
| 2005/0224514 A1 | 10/2005 | Westenberger |

FOREIGN PATENT DOCUMENTS

| CN | 101758819 A | 6/2010 |
| CN | 101792910 A | 8/2010 |
| DE | 42 07 117 C1 | 4/1993 |
| DE | 44 34 829 A1 | 4/1996 |
| DE | 101 43 159 A1 | 3/2003 |
| DE | 10 2008 006 575 A1 | 10/2008 |
| DE | 10 2014 005 290 A1 | 10/2015 |
| GB | 2 396 851 A | 7/2004 |
| JP | 2002-343405 A | 11/2002 |
| JP | 2006-302802 A | 11/2006 |

*Primary Examiner* — Ladan Mohaddes
(74) *Attorney, Agent, or Firm* — Seed Intellectual Property Law Group LLP

(57) ABSTRACT

A device for supplying fuel to a motor vehicle having a fuel cell, comprising a generating device for generating hydrogen, a filling device for filling an exchangeable hydrogen storage device with hydrogen generated, and a loading and unloading device for the automatic unloading of an emptied hydrogen storage device from a mounting device of the motor vehicle, as well as for loading the mounting device with a filled hydrogen storage device.

20 Claims, 5 Drawing Sheets

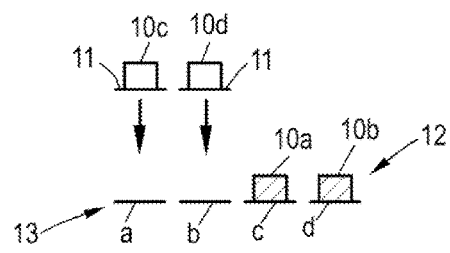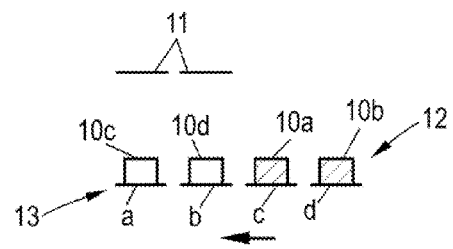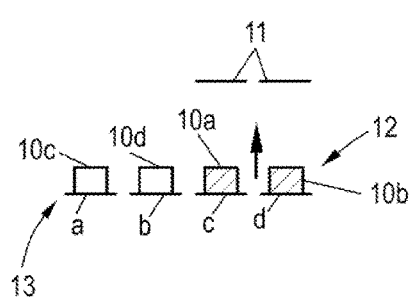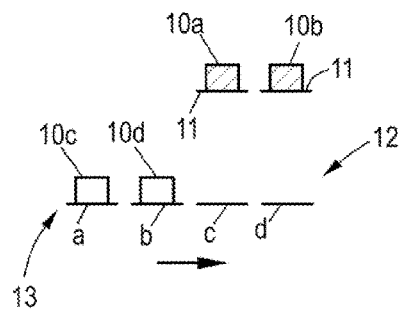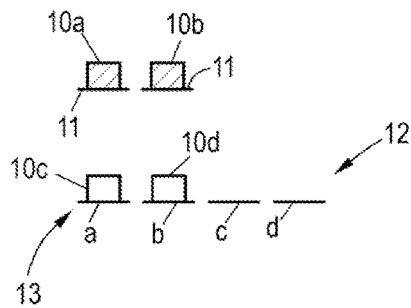

DEVICE FOR SUPPLYING FUEL TO A MOTOR VEHICLE HAVING A FUEL CELL

BACKGROUND

Technical Field

The present disclosure relates to a device for supplying fuel to a motor vehicle having a fuel cell.

Description of the Related Art

An alternative possibility for operating a motor vehicle is the use of a fuel cell in which fuel is used in the form of hydrogen to generate electrical energy. For this purpose, a corresponding hydrogen storage device is to be provided in the vehicle, from which the required hydrogen is removed. This hydrogen storage device can be refilled at a corresponding filling station, as is known from conventional fossil fuels or for charging electric drive storage devices. However, such hydrogen filling stations are not too widespread, which is to say that there is only insufficient infrastructure for supplying such motor vehicles having a fuel cell, which adversely affects the acceptance of such motor vehicles.

From GB 2 396 851 A, a device is known which allows an automatic exchange of a replaceable hydrogen storage device installed in a vehicle. For this purpose, the emptied hydrogen storage device is removed from the motor vehicle, while a filled hydrogen storage device is inserted, so that the vehicle is again "refueled." For this purpose, a suitable loading and unloading device is provided, wherein the hydrogen storage devices are removed from a storage facility in which they are present in the filled condition.

BRIEF SUMMARY

The present disclosure is based upon the aim of specifying a device for supplying a motor vehicle having a fuel cell with a fuel, which permits the supply in a simple manner and is particularly applicable to the end user.

In order to solve this problem, the present disclosure provides a device for supplying fuel to a motor vehicle having a fuel cell, comprising a generating device for generating hydrogen, a filling device for filling an exchangeable hydrogen storage device with hydrogen generated, and a loading and unloading device for automatically unloading an emptied hydrogen storage device from a mounting device of the motor vehicle and for loading the mounting device with a filled hydrogen storage device.

The device is a self-sufficient system. Hydrogen is produced on-site via the generating device, which is to say that the fuel is produced directly at the location of the loading and unloading operation. Therefore, it is not necessary to provide the hydrogen, as is customary in filling stations, in large storage devices which are filled from time-to-time via tanker trucks. On the contrary, the hydrogen is generated on-site, which is preferably effected by means of electrolysis. This makes it particularly attractive to the end user or the vehicle owner for such a device to be provided in the home, because this makes said user completely independent of any infrastructure required for "refueling" in his neighborhood. On the one hand, in the home, of course, a power outlet is provided, which allows the generation of hydrogen by electrolysis. On the other hand, a water connection is provided, which provides the water required for hydrogen generation.

Furthermore, a filling device is provided, which makes it possible to fill a replaceable hydrogen storage device with hydrogen generated on-site. This means that an automatic refilling of a hydrogen storage device is also provided in the home, so that, if a refueling is to take place, a replaceable hydrogen storage device is either already available or can be filled within a very short time with hydrogen generated.

Furthermore, an automatic loading and unloading device is provided, which allows an automatic exchange of storage devices. The loading and unloading device allows an automatic unloading of an emptied hydrogen storage device from a mounting device in the vehicle, and an automatic loading of a filled hydrogen storage device into the mounting device. This means that the user does not have to carry out any manual work, i.e., neither to fill the hydrogen storage device nor to exchange the storage device.

Such a device, which is a self-contained system, can easily be installed in the home, e.g., in the area of a garage or a carport, where the motor vehicle is usually parked. This allows the user to automatically perform all the necessary actions at home, starting with the automatic generation of hydrogen, from the automatic filling of a hydrogen storage device through the automatic loading and unloading. It is only necessary that he place his motor vehicle into the working area of the device or the loading and unloading device, whereupon the corresponding activities, if not already done, are carried out automatically.

The generating device itself is preferably associated with a storage device for intermediate storage of hydrogen generated, from which the hydrogen can be extracted via the filling device. The generating device can thus produce a certain quantity of hydrogen as a reserve, which is stored in the intermediate storage device. If a storage device exchange takes place, the removed, emptied hydrogen storage device can be filled immediately via the filling device, since a sufficient quantity of hydrogen is already available, which does not have to first be produced by the generating device. This means that, consequently, the removed storage device can be immediately refilled and reinserted into the mounting device in the motor vehicle. Alternatively, it is, of course, conceivable that a previously-filled hydrogen storage device is already present, which is used in exchange for the removed, emptied hydrogen storage device, such that the exchange can be carried out even more quickly, since the refilling from the intermediate storage device may occur only after the exchange has taken place, at any time later.

In principle, it would, of course, also be conceivable to generate the hydrogen by means of the generating device only when it is needed, i.e., when a hydrogen storage device is to be filled. If, therefore, a hydrogen storage device is removed which is to be used again, the hydrogen is generated and transferred directly into the hydrogen storage device via the filling device. Once the filling has been completed, it can then be used again.

If the device comprises several hydrogen storage devices, wherein one or more of the hydrogen storage devices is always provided at the device, this stored hydrogen storage device can also be filled with "freshly" generated hydrogen at a later point in time.

It is conceivable that several hydrogen storage devices are simultaneously filled by means of the filling device. This is particularly expedient when two or more such hydrogen storage devices are provided in the motor vehicle. These hydrogen storage devices, which can also be referred to as cartridges, are then designed somewhat smaller than if only one large hydrogen storage device is installed in the vehicle. It is, for example, conceivable that such a single hydrogen storage unit or such a cartridge in the filled state should not exceed a weight of 10 kg or is designed in such a way that the hydrogen stored therein should be sufficient for a range of approximately 200 km.

Furthermore, it can be provided that a hydrogen storage device which has just been removed from the mounting device via the loading and unloading device be brought directly into the filling position via said loading and unloading device, which is to say that, in effect, this filling position corresponds to its insertion position, from which it is then reinserted, after it has been filled. However, it is expedient if the loading and unloading device has a displacement device for moving a filled hydrogen storage device into an insertion position for loading the mounting device and for moving a removed hydrogen storage device into a filling position for filling with hydrogen. The hydrogen storage devices can thus be brought into a certain position via the displacement device, where they are "processed" further. This makes it possible, in particular, if one or more filled hydrogen storage devices are already provided at the device, to move said hydrogen storage devices quickly and easily into the insertion position, or to bring the removed hydrogen storage device(s) into the filling position in the reverse direction. This allows the corresponding exchange to be carried out very quickly.

In this context, it is expedient if the loading and unloading device is designed for the simultaneous unloading of at least two or more emptied hydrogen storage devices and/or for the simultaneous insertion of at least two or more filled hydrogen storage devices into the mounting device in the vehicle. At the same time, for example, two empty hydrogen storage devices can be removed and brought into the filling position via the displacement device, after which two filled hydrogen storage devices can simultaneously be brought into the insertion position via the displacement device and can be reinserted at the same time in the vehicle by means of the loading and unloading device.

A particularly expedient further development provides a photovoltaic device in which the hydrogen-generating device can be operated via the photovoltaically-generated electricity. This inventive design makes the device further independent of external or infrastructure-related conditions, since the electricity required for electrolysis is also self-sufficiently generated via the photovoltaic device. Many households now have their own photovoltaic devices that generate solar power. This can be used for the generation of hydrogen. The solar power can, for example, be temporarily stored in a suitable storage battery, which is usually present anyway, so that the generating device can always be operated via solar power if required.

The generation device—the filling device, as well as the loading and unloading device—is preferably installed in the floor of a structure traversable by the motor vehicle—preferably a garage, for example, but also a carport. This makes the integration into the home easy and allows for simple use. It is necessary only for the driver to drive the motor vehicle over the device, after which the automatic exchange can take place. It is even conceivable that, if the vehicle is designed for at least partly autonomous operation, the motor vehicle also automatically traverses the device, and the replacement is carried out when the vehicle recognizes that an exchange is required.

In order that the device does not start a hydrogen storage change automatically when a motor vehicle is in its working area, which can be recognized by a suitable detection sensor system of the device, but only when this is actually required and desired, an appropriate further development provides at least one communication device comprising a receiving device for receiving a request signal sent from the motor vehicle relating the exchange of at least one hydrogen storage device, wherein at least the operation of the loading and unloading device, and, optionally, also the operation of the filling device and/or the generating device is controllable as a function of the request signal. The motor vehicle, for example, automatically transmits a request signal after it has traversed the device, which, for example, communicates the current hydrogen level, whereupon it is determined by the device whether or not an exchange is required. Alternatively, an exchange signal which requires the exchange can also be sent directly. Regardless of the content of this request signal, the control of the operation of the loading and unloading device takes place as a function of this request signal—in particular, if one or more filled hydrogen storage devices are already present. If these are still to be filled or the required hydrogen is still to be generated, the operation of the filling device and/or the generating device can also be controllable as a function of this request signal.

This means that the storage device exchange is ultimately only affected if it is actually required and is ordered by the motor vehicle itself.

The loading and unloading device, which can, for example, operate purely mechanically or hydraulically or in like manner, interacts mechanically with the motor vehicle. For this purpose, the loading and unloading device has corresponding tools which can grip a hydrogen storage device and release any releasable connections of the hydrogen storage device to the mounting device on the motor vehicle. This requires that the motor vehicle be arranged around the loading and unloading device in a specific operating area, which is to say that the motor vehicle is correctly positioned with respect to the loading and unloading device. To ensure this, the device preferably comprises a detection device for detecting the position of the motor vehicle relative to the loading and unloading device. This detection device comprises one or more sensors or cameras or the like which determine the motor vehicle position. Depending upon what the detected position of the motor vehicle is, the operation varies. If the detected position is correct, the exchange operation can be carried out immediately—optionally, after detection of a corresponding request signal. The correct position can, for example, be communicated visually or acoustically to the driver via a display device, so that he can be sure that the motor vehicle is correctly positioned. If, however, the position detection shows that the motor vehicle is not correctly positioned, then a position correction is required. This information can also be communicated visually or acoustically to the driver in a suitable manner, so that he can make the correction, wherein the information may also contain an indication of what the correction should look like.

In the context of this information display, a display device arranged exterior to the vehicle can be used, e.g., a monitor which, for example, is installed in the garage. Alternatively, it is also possible to use a display device—usually a monitor—which is installed in the motor vehicle and is used for outputting customary vehicle-specific information. In this case, the information about the communication device or a communication device comprising a transmission device is transmitted to a receiving device of the vehicle. Thus, communication takes place between the device installed at the garage and the vehicle itself. The driver then sees on the display in the vehicle whether the vehicle is correctly positioned, or to what extent and how any corrections may be required.

As an alternative to the output of the information via a corresponding display device, which information output in this case is directed to the driver, it is conceivable to provide information about the positioning of the motor vehicle via the communication device or a communication device comprising a transmission device concerning the positioning to the at least partially autonomously-driven motor vehicle as a function of the position detection. Here, it is assumed that the motor vehicle either partially autonomously or completely autonomously assumes the position above the device, and thus "goes fueling" independently. In this case, a position detection is also carried out, wherein the device and the motor vehicle communicate with one another, so that the device correctly controls the motor vehicle in reaching the loading and unloading position. This means that control signals are transmitted as information, based upon which the vehicle then at least partially autonomously assumes the position and corrects any faulty position, respectively.

BRIEF DESCRIPTION OF THE SEVERAL VIEWS OF THE DRAWINGS

Further advantages and details result from the exemplary embodiments described in the following and from the drawings. The following is shown:

FIGS. 10-14 are schematic representations for explaining the operation of the hydrogen storage device according to a second embodiment.

DETAILED DESCRIPTION

Figure 1:
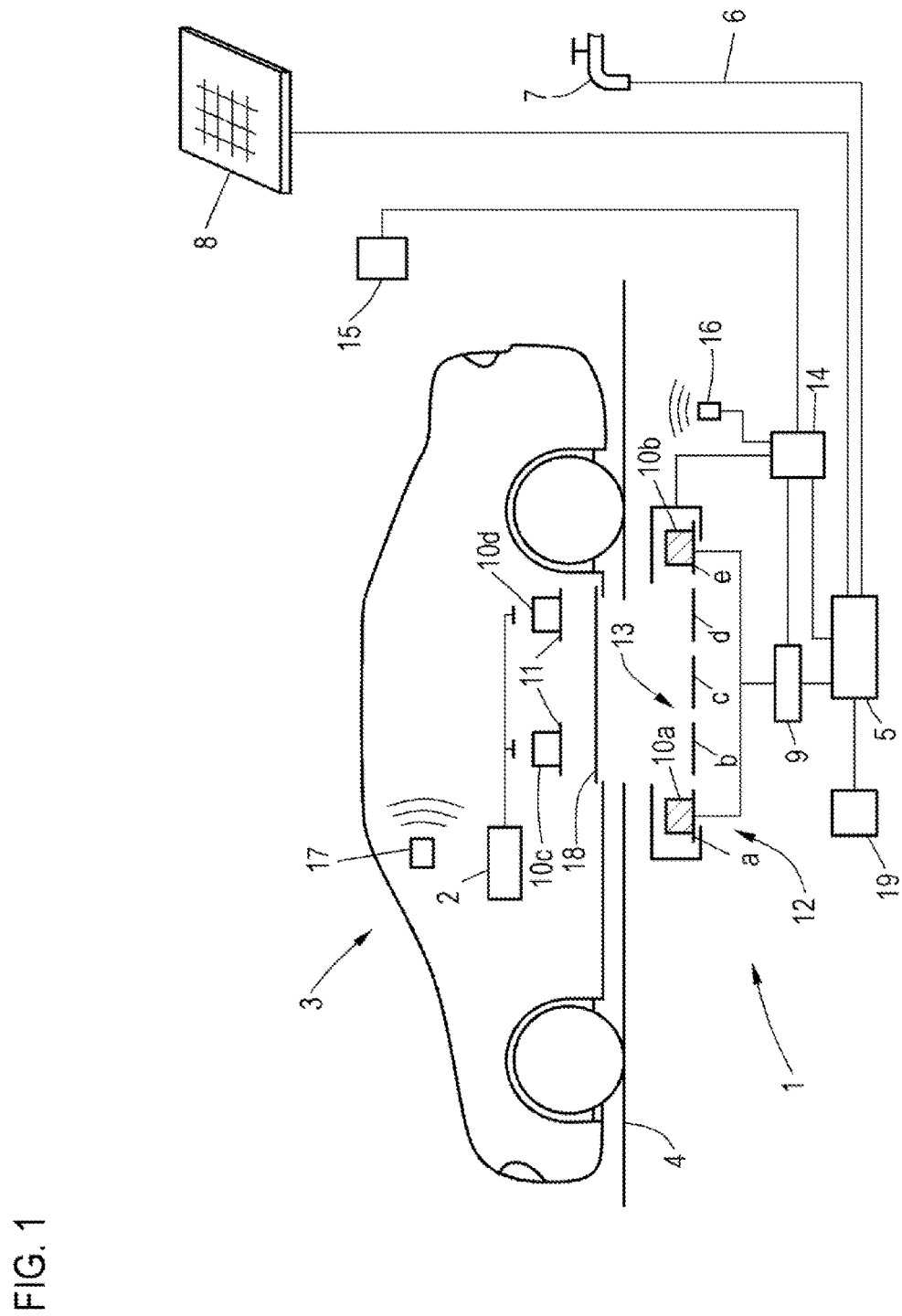
FIG. 1 shows a schematic representation of a device with a motor vehicle located in its working area.

FIG. 1 shows a device 1 for supplying a motor vehicle 3 having a fuel cell 2. The device 1 is, with its central components, as will be discussed below, introduced into the floor 4 of, for example, a garage, so that the motor vehicle 3 can traverse the device 1.

The device 1 comprises a generating device 5 for the electrolytic generation of hydrogen. The water required for this is provided via a line 6 from a domestic water supply connection 7.

The required electricity for the operation of the electrolytic generating device 5 is provided by a photovoltaic device 8 provided at the home, via which solar power can be generated autonomously. If necessary, this can be buffered via an intermediate storage device (not shown) and, if necessary, made available to the generating device 5.

The device 1 also comprises a filling device 9, which serves to fill exchangeable, emptied hydrogen storage device with hydrogen generated. In the example shown, a total of four hydrogen storage devices 10a, 10b, which are filled in the initial situation shown in FIG. 1 (as shown by the dashed line) and located at the device, are arranged within the system, and two hydrogen storage devices 10c, 10d are provided which are arranged in the corresponding mounting devices 11 in the motor vehicle 3.

The hydrogen storage devices 10a-d are correspondingly moved and exchanged, as will be discussed below.

The filling device 9 is capable of filling previously emptied hydrogen storage devices—in the illustrated example, the hydrogen storage devices 10a and 10b at the filling positions. In the example shown, the filling positions are provided in a fixed position.

Furthermore, a loading and unloading device 12 is provided, comprising a displacement device 13, by means of which filled and emptied hydrogen storage devices 10a-d can be displaced, as will be discussed below.

The device 1 further comprises a control device 14 which, for example, controls the operation of the generating device 5, the filling device 9, and the loading and unloading device 12, as well as their displacement device 13. In addition, a sensor device 15 is associated with the control device 14, via which the position of the motor vehicle 3 relative to the device 1 can be detected, i.e., whether the motor vehicle 3 has assumed a correct relative position with respect to the device 1—in particular, with respect to the loading and unloading device 12.

Furthermore, a communication device 16 is assigned to the control device 14, which makes it possible to communicate with a corresponding communication device 17, which is provided in the vehicle. Via the communication device 17 or its transmission device, a corresponding request signal can be sent to the communication device 16 or its receiving device indicating that a hydrogen storage device exchange is required on the part of the motor vehicle 3 located above.

Via the communication device 16, information regarding the correct or incorrect positioning of the motor vehicle 3 relative to the device 1 or the loading and unloading device 12 can also be transmitted to the communication device 17. This can be displayed to the driver, for example, on a display (not shown) in the vehicle, or a display device, which is also not shown in detail, with, if needed, information relating to a position correction. If the motor vehicle 3 is a vehicle which is at least partially autonomously-driven, this information may comprise control signals based upon which the motor vehicle 3 can then automatically drive into the correct position.

Starting from FIG. 1, FIGS. 2-9 show various representations for explaining the sequence of an exchange process, wherein the device 1 is shown only in sections.

According to FIG. 1, the motor vehicle 3 is located above the loading and unloading device 12 in an already correct position, as detected by the sensor device 15. The communication device 17 sends a request signal to the communication device 16, whereupon the control device 14 initiates the operation.

A closure device 18 is initially opened by the motor vehicle 3 so that the emptied hydrogen storage devices 10c, 10d are exposed and can be gripped via the loading and unloading device 12 by means of a suitable loading and removal mechanism—for example, suitable cylinders with corresponding tools or the like.

Figure 2:
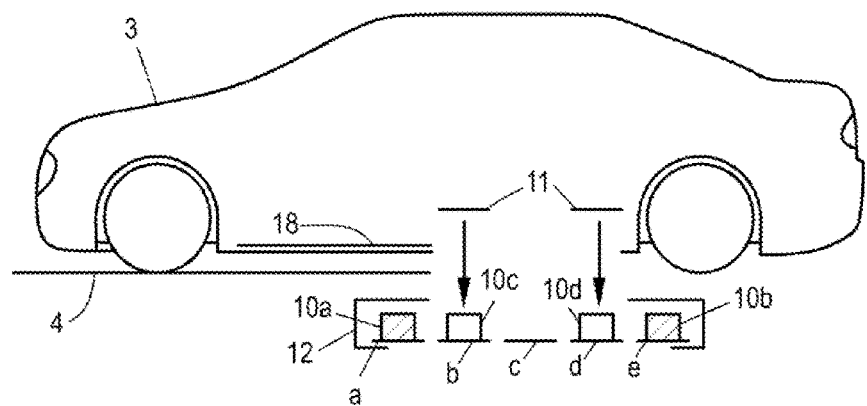
FIGS. 2-9 are various schematic representations for explaining the operation of the hydrogen storage device according to a first embodiment.
Figure 3:
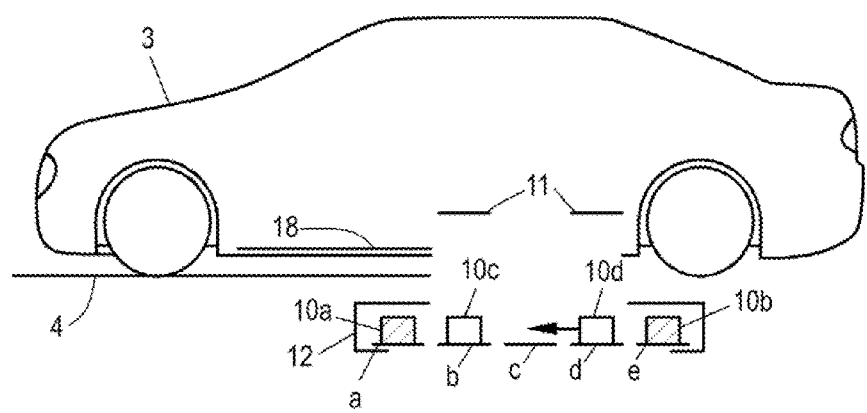

When the closure device 18 is opened, the two hydrogen storage devices 10c, 10d are released from their mounting devices 11 via the loading and unloading device 12 and moved downwards into the receptacles b and d of the displacement device 13, which comprises a total of five receptacles a, b, c, d, and e, and are received there as shown in FIG. 2. The positions a and e are each occupied by one filled hydrogen storage device 10a, 10b, and positions b and d are each occupied with an emptied hydrogen storage device 10c, 10d, the middle position c being unoccupied.

In the following step (see FIG. 3), the two hydrogen storage devices 10d and 10b are displaced on the displacement device 13. They are moved to the left up to the position shown in FIG. 4, in which the emptied hydrogen storage device 10d is arranged at the position c, and the filled hydrogen storage device 10b is arranged at the position d.

The two other hydrogen storage devices 10a and 10c remain at their previous positions a and b.

Figure 4:
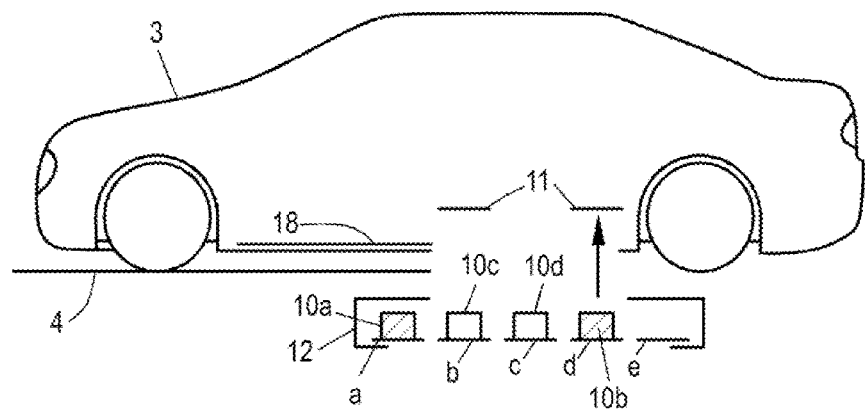
Figure 5:
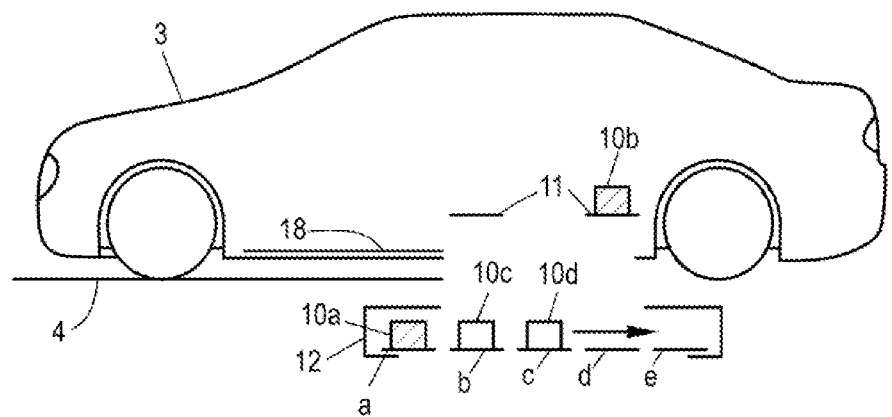

After the positions b and d are located directly below the two mounting devices 11, the filled hydrogen storage device 10b can now be inserted into the right mounting device 11 by means of the loading and unloading device 12, as indicated in FIG. 4. This situation is shown in FIG. 5. That is, the first filled hydrogen storage device 10b is inserted into the vehicle.

Figure 6:
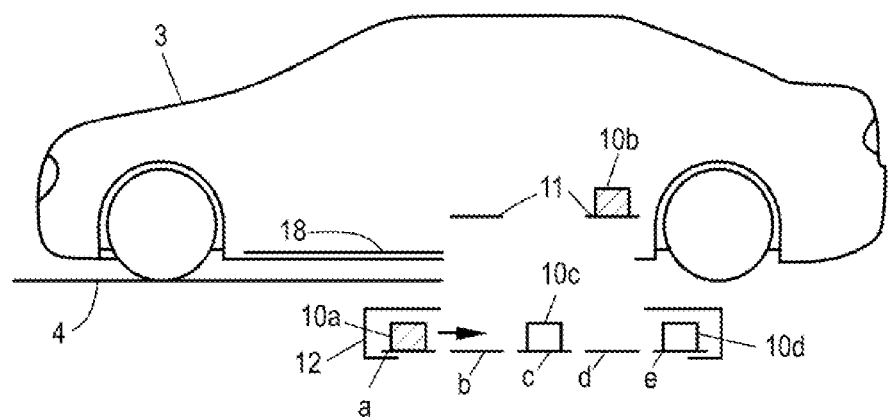

As shown in FIG. 5, the two emptied hydrogen storage devices 10c, 10d are then moved on the displacement device 13 to the right, until they assume the positions shown in FIG. 6. The hydrogen storage device 10c is located at the position c, and the hydrogen storage device 10d is at the position e.

Figure 7:
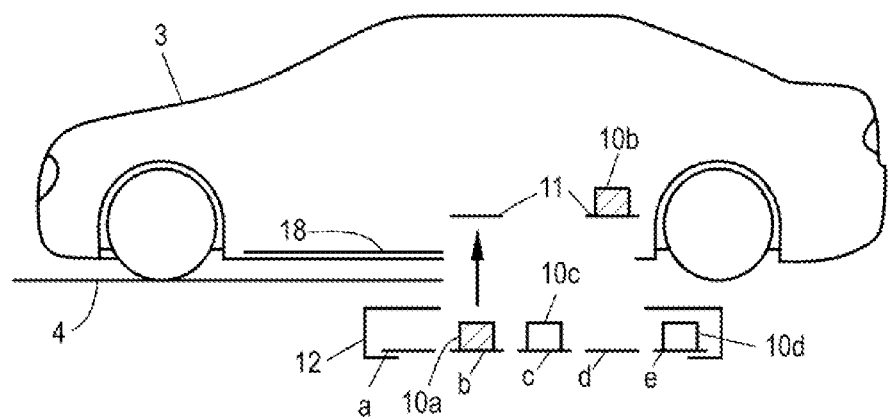
Figure 8:
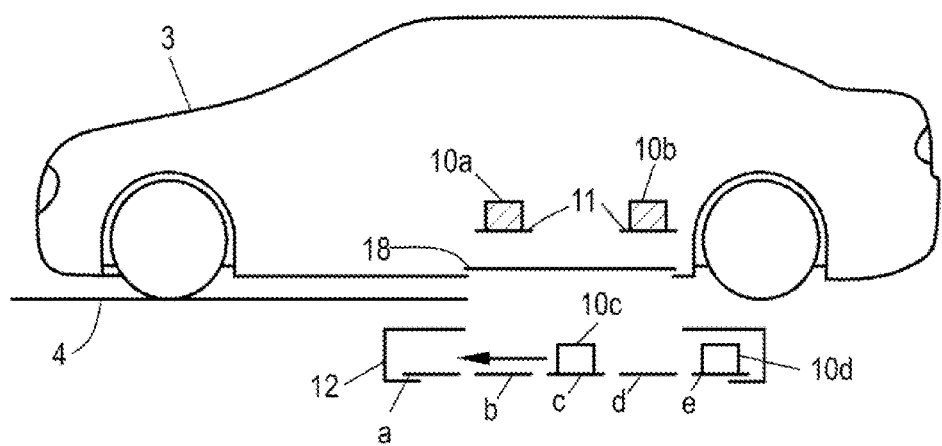

In the next step, the second filled hydrogen storage device 10a, as shown by the arrow, is moved from its position a to position b; see FIG. 7. In this position, it is located in the loading position, since the position b is also directly below the second mounting device 11 of the motor vehicle 3. The filled hydrogen storage device 10a is then moved upwards, as shown in FIG. 7, and inserted into the mounting device 11. This situation is shown in FIG. 8, in which both filled hydrogen storage devices 10a, 10b are accommodated in the mounting positions 11 of the motor vehicle. Then, the actual exchange operation is completed, the closing device 18 is closed again, and the motor vehicle is "refueled" and may, theoretically, continue to drive.

However, the operation on the part of the device 1 continues even further after the two emptied hydrogen storage devices 10c, 10d to be refilled are present in the device 1.

Figure 9:
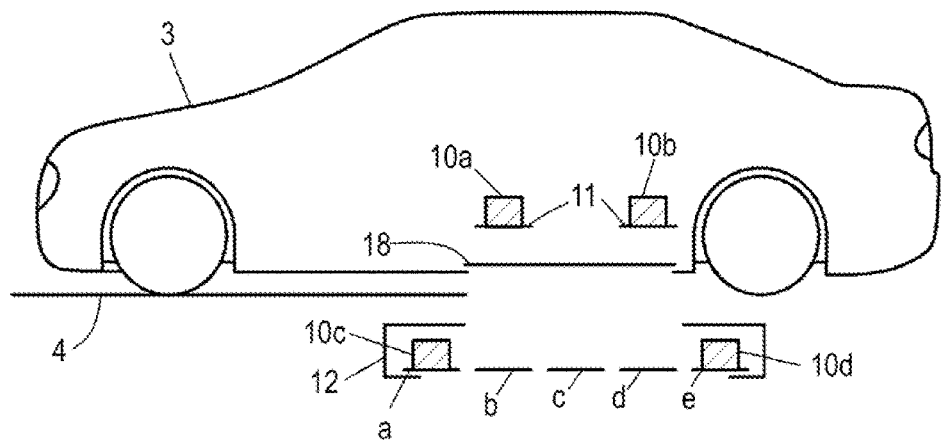

For this purpose, starting from FIG. 8, the hydrogen storage device 10c located at the position c is moved to the left into the position a. In this position, it is shown in FIG. 9, where it is in the filling position. The hydrogen storage device 10d is already in the filling position at the position e. As already described, the positions a and e on the part of the displacement device 13 are the positions which define the filling positions; here, the emptied hydrogen storage devices 10c, 10d can again be filled with hydrogen generated by the generating device 5, and the filling process begins with assuming the filling positions. The hydrogen can be extracted from a hydrogen storage device 19, in which generated hydrogen can be stored temporarily.

Starting from FIG. 9, the newly-filled hydrogen storage devices—in this case, the hydrogen storage devices 10c and 10d—are in the base position shown in FIG. 1; a new exchange operation can occur when a motor vehicle 3 traverses the device 1 in the manner described above.

FIGS. 10-14 show an alternative loading scheme in the form of schematic representations, which merely show the different positions of the hydrogen storage devices. The two mounting devices 11, with the emptied hydrogen storage devices 10c, 10d and the displacement device 13, are shown as part of the loading and unloading device 12, wherein only four positions a, b, c, and d are provided here. The filled hydrogen storage devices 10a, 10b are located at positions c and d.

If, following detection of a correctly positioned motor vehicle 3, the exchange operation takes place, starting from FIG. 10, the two emptied hydrogen storage devices 10c, 10d are first detached from the mounting devices 11 by means of the loading and unloading device 12 and are removed and taken into positions a and b of the displacement device 13.

Then, as shown in FIG. 11, the displacement device 13 is moved to the left along the arrow; all positions a-d move. The movement takes place until the filled hydrogen storage devices 10a, 10b are in the loading position below the receiving devices 11. Then, as shown by the arrow in FIG. 12, the two hydrogen storage devices 10a, 10b are lifted via the loading and unloading device 12 and inserted into the mounting devices 11. The motor vehicle is thus loaded, and the actual storage device exchange is completed. This situation is shown in FIG. 13.

Starting from FIG. 13, as shown by the arrow, the displacement device 13 again moves to the right in the position shown in FIG. 14, in which the emptied hydrogen storage devices 10c, 10d are in the filling position. The filling device 9 now move towards these filling positions and fills the hydrogen storage devices 10c, 10d. With this alternative, therefore, a change in the filling positions is provided. While, starting from FIG. 10, the hydrogen storage devices 10a, 10b were filled in the positions c and d, the next hydrogen storage devices 10c, 10d are filled in the positions a, b after an exchange.

If, starting from FIG. 14, a new exchange takes place, the displacement device 13 would initially move to the left until the positions c and d are located below the hydrogen storage devices to be removed, whereupon these are removed. The operation then runs virtually in reverse to the operation described in FIGS. 10-14, i.e., the directions of movement are reversed during this subsequent cycle. The cycle following thereafter corresponds to the sequence diagram shown in the figures.

German patent application no. 10 2016 218 616.7, filed Sep. 27, 2016, is hereby incorporated herein by reference, in its entirety. The various embodiments described above can be combined to provide further embodiments. These and other changes can be made to the embodiments in light of the above detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A device for supplying fuel to a motor vehicle having a fuel cell, comprising:
   a generating device for generating hydrogen;
   a filling device for filling an exchangeable hydrogen storage device with hydrogen generated;
   a loading and unloading device configured to automatically:
      unload first and second empty hydrogen storage devices from first and second mounting devices of the motor vehicle into the loading and unloading device;
      after unloading the first and second empty hydrogen storage devices, move the first empty hydrogen storage device and a first full hydrogen storage device adjacent to the first empty hydrogen storage device horizontally with respect to the motor vehicle;
      after moving the first empty hydrogen storage device and the first full hydrogen storage device, load the first mounting device with the first full hydrogen storage device;
      after loading the first mounting device, move the first empty hydrogen storage device, the second empty storage device, and a second full h hydrogen storage device adjacent to the second empty hydrogen storage device horizontally with respect to the motor vehicle; and after moving the first empty hydrogen storage device, the second empty hydrogen storage device and the second full hydrogen storage device, load the second mounting device with the second full hydrogen storage device, a detection device for detecting a position of the motor vehicle relative to the loading and unloading device; and a display device of the motor vehicle for outputting information corresponding to the position of the motor vehicle relative to the loading and unloading device.

2. The device according to claim 1, further comprising:
a storage device in fluid communication with the generating device for intermediate storage of generated hydrogen, wherein the filling device extracts hydrogen from the storage device.

3. The device according to claim 1 wherein several hydrogen storage devices can be filled simultaneously by the filling device.

4. The device according to claim 1, further comprising:
a photovoltaic device electrically coupled to the generating device, wherein the generating device electrolytically generates hydrogen via a photovoltaically generated current from the photovoltaic device.

5. The device according to claim 1 wherein the generating device, the filling device, and the loading and unloading device are installed in a floor of a structure drivable over by the motor vehicle.

6. The device according to claim 1, further comprising:
a control device, the control device including a first communication device for receiving a request signal transmitted by a second communication device of the motor vehicle, the request signal corresponding to initiation of an exchange of at least one hydrogen storage device, wherein the loading and unloading device is controlled by the control device as a function of the request signal.

7. The device according to claim 1, further comprising:
a control device, the control device including a first communication device for receiving a request signal transmitted by a second communication device of the motor vehicle, the request signal corresponding to initiation of an exchange of at least one hydrogen storage device, wherein the filling device is controlled by the control device as a function of the request signal.

8. The device according to claim 1, further comprising:
a control device, the control device including a first communication device for receiving a request signal transmitted by a second communication device of the motor vehicle, the request signal corresponding to initiation of an exchange of at least one hydrogen storage device, wherein the generating device is controlled by the control device as a function of the request signal.

9. The device according to claim 1 wherein the information is transmitted to a receiving device of the motor vehicle via a transmitting device in communication with a sensor device for detecting the position of the motor vehicle.

10. The device according to claim 9 wherein the motor vehicle is an at least partially autonomously-driven motor vehicle.

11. A method of supplying fuel to a motor vehicle having a fuel cell, comprising:
generating hydrogen at a hydrogen generator;
filling an exchangeable hydrogen storage device with the generated hydrogen;
automatically unloading first and second empty hydrogen storage devices from first and second mounting devices of the motor vehicle into a loading and unloading device;
after unloading the first and second empty hydrogen storage devices, automatically moving the first and second empty hydrogen storage devices and first and second full hydrogen storage devices horizontally with respect to the motor vehicle,
after moving the first and second empty hydrogen storage devices and the first and second full hydrogen storage devices, automatically loading the first and second mounting devices of the motor vehicle with the first and second full hydrogen storage devices from the loading and unloading device;
detecting a position of the motor vehicle relative to the hydrogen generator using a camera; and
outputting information corresponding the position of the motor vehicle relative to the hydrogen generator for use by an operator of the motor vehicle using at least one digital display device in the motor vehicle.

12. The method according to claim 11 wherein generating hydrogen includes a photovoltaic cell providing a photovoltaic current for electrolytically generating hydrogen.

13. The method according to claim 11 wherein generating hydrogen includes installing the hydrogen generator in a floor of a structure drivable over by the motor vehicle.

14. The method according to claim 11 wherein the motor vehicle is at least partially autonomous and the method further comprises transmitting information concerning the position of the motor vehicle relative to the hydrogen generator to the motor vehicle, the motor vehicle autonomously adjusting the position of the motor vehicle relative to the hydrogen generator based on the information.

15. The method according to claim 11 wherein unloading the first and second empty hydrogen storage devices includes simultaneously unloading the first and second empty hydrogen storage devices and loading the first and second mounting devices includes simultaneously loading the first and second mounting devices of the motor vehicle with the first and second full hydrogen storage devices.

16. The method according to claim 11 wherein moving the first and second empty hydrogen storage devices and first and second full hydrogen storage devices includes moving the first and second empty hydrogen storage devices and first and second full hydrogen storage devices in the same direction as one another.

17. The method according to claim 11, further comprising, after loading the first and second mounting devices of the motor vehicle, automatically moving the first and second empty hydrogen storage devices horizontally with respect to the motor vehicle.

18. The device according to claim 1 wherein the loading and unloading device is configured to automatically unload the first and second empty hydrogen storage devices simultaneously.

19. The device according to claim 1 wherein the loading and unloading device is configured to automatically move the first empty hydrogen storage device and the first full hydrogen storage device in the same direction as one another and to automatically move the first empty hydrogen storage device, the second empty hydrogen storage device, and the second full hydrogen storage device in the same direction as one another.

20. The device according to claim 1 wherein the loading and unloading device is further configured to automatically, after loading the second mounting device, move the second empty hydrogen storage device horizontally with respect to the motor vehicle such that the first empty hydrogen storage device occupies a position occupied by the first full hydrogen storage device prior to the moving of the first full hydrogen storage device and the second empty hydrogen storage device occupies a position occupied by the second full hydrogen storage device prior to the moving of the second full hydrogen storage device.

\* \* \* \* \*